Patented Jan. 18, 1938

2,105,486

UNITED STATES PATENT OFFICE 2,105,486

WHOOPING COUGH VACCINE AND METHOD OF MAKING THE SAME

Hans Langer, Berlin-Wilmersdorf, and Erich Putter, Berlin-Charlottenburg, Germany, assignors to Schering-Kahlbaum A. G., Berlin, Germany, a corporation of Germany No Drawing. Application September 10, 1934, Serial No. 743,410. In Germany September 14, 1933

13 Claims. (Cl. 167—78)

The present invention relates to an improved method for preparing vaccines from whooping cough bacteria and to the vaccines so produced.

Since the discovery of the whooping cough bacillus by Bordet and Gengou, there has repeatedly been mentioned in the literature that the whooping cough bacillus unconditionally requires a hemoglobin in the first generations for its growth upon artificial culture media, but that it gradually can be accustomed to hemoglobin-free culture media (see in Kolle, Kraus, Uhlenhuth: Handb. der pathogen. Mikro-organismen, Vol. V, 2, the article by Loewenthal and Zurukzoglu, page 1346 ff.). According to more recent researches of English investigators (see Gardner and Leslie, The Lancet 222, 9(1932)), this getting accustomed to hemoglobin-free culture media takes place simultaneously with a far-reaching antigen conversion. The serological initially unitary phases I and II (or A and B) are transformed, according to these investigators, into the serologically separable phases III and IV which can be recognized by the manner of appearance of their colonies. While phases I and II correspond to the S-form, phases III and IV represent the R-form. It is of particular importance that the toxicity of the cultures also disappears with the phase change. Only phases I and II are toxic.

Contrary to all of these assertions, we have now found that from the different whooping cough epidemics of the last few years, over fifty stocks could be isolated which are fundamentally distinguished from those heretofore described in the literature by the fact that they proved themselves absolutely constant in every particular. In more than four years of observation these stocks have been cultivated in one hundred subcultures. They were found to have retained all of their properties unchanged. None of these stocks could be made accustomed to a hemoglobin-free medium. Upon a hemoglobin-free substratum, they no longer grow to any appreciable extent. The external appearance of the colonies is unchanged and there cannot be said to be any phase change. Their toxicity, and to this fact special attention is called, is retained to its full extent.

These whooping cough stocks, over fifty in number, are thus distinguished fundamentally from those heretofore described. They are the initial material for the partial antigens described below. As already mentioned, the toxicity of the whooping cough bacillus has been known for a long time. It depends upon an endo-toxin which is firmly attached to the body of the bacterium. It has been repeatedly attempted to separate the toxic portion in soluble form from the corpuscular components which in themselves are non-poisonous. Of these methods, the best known is that of Besredka. The methods heretofore described are, however, hardly practical, for the production of a high grade soluble bacteria-free toxin cannot in general be obtained therewith with sufficient uniformity.

We have now found that high grade toxic products in the form of solutions or suspensions can be obtained in a reliable manner by bursting the structure of the bodies of the bacteria in such a way that the residue remaining from the bacteria upon microscopic examination appears only as an amorphous mass. This bursting of the bodies of the bacteria can, for example, take place according to known methods, as by mechanical treatment, such as grinding in a mortar, or treatment with a hypotonic solution, as by extraction with distilled water, or more effectively by repeated freezing and thawing of the growth of cultures, a method which has not yet found use for mechanically breaking up the bacteria, each of these methods yielding the desired suspension. Such pre-treated suspensions, no matter how produced, can then be freed from the insoluble fragments of the bacteria, for example, by centrifuging, and now represent the poisonous materials which have gone into solution and which were previously contained in the bodies of the bacteria. The toxicity can be easily demonstrated by intradermal, subcutaneous, or intravenous application on experimental animals (rabbits and guinea-pigs). An evaluation of the toxicity can be obtained by determining the dosis necroticans minima with guinea-pigs and rabbits. In this way the manufacture of the desired toxic concentration is insured.

In carrying out the process, the following procedure may be followed:

As starting material there are used preferably as many as fifty and even more whooping cough bacillus cultures containing bacteria originating in different epidemics occurring at different times and places, and whose cultural properties and toxin formation remain substantially constant even upon long and continuous cultivation upon artificial culture media.

In order to maintain this constancy it is necessary to cultivate the bacteria under the most favorable conditions. This is accomplished in the first place by using a suitable culture medium containing a very large amount of blood, such as a potato-blood-agar medium. Of course, the other requirements such as proper temperature of cultivation, degree of humidity, frequent inoculation and so forth have also to be fulfilled. The mass of bacteria cultivated in such a manner is washed with physiological salt solution and brought to the freezing condition, for instance, in a freezing mixture. After complete freezing has set in, it is thawed at room temperature and then again frozen. This procedure is repeated a number of times. If the sediment of such pretreated bacterial suspensions is now examined under the microscope, one can ascertain that the bacteria have been converted into an amorphous mass. The suspension may now be centrifuged to remove the insoluble bacterial matter.

Not alone the soluble toxic materials are of immunological importance but also the insoluble non-toxic bacterial residues. In addition to the production of poisonous but bacteria-free antigens, the production of non-toxic whooping cough bacillus antigens can be carried out in this way. Also, by the action of higher temperatures the poison can be destroyed, without, however, destroying the immunological value of the previously toxic antigen.

For instance, the growths of whooping cough bacillus cultures, obtained from a number of stocks originating in different epidemics, as hereinbefore described, is suspended in physiological salt solution. The suspension is centrifuged and the sediment obtained is repeatedly washed with physiological salt solution in order to remove completely the adherent culture medium. Thereupon the sediment is again suspended in physiological salt solution. A suitable disinfectant, such as ortho-hydroxy benzoic acid methyl ester, is added to said suspension, in order to prevent the growth of contaminating bacteria. The amount of physiological salt solution added is calculated so that in 1 cc. of vaccine there are present 20 billions of whooping cough bacteria. After filling the vaccine into suitable flasks or ampoules, the latter are heated twice for 10 minutes to about 100° C. By this procedure the toxin is completely destroyed and a vaccine is obtained which is equally suitable for a prophylactic as well as therapeutic treatment of whooping cough. It can be applied to patients of any age, babies as well as grown-ups, whereby no irritating effects are observed. Hence, by this method it is possible to produce vaccines of high concentration of bacteria which do not cause irritations even when applied in very high doses.

Investigation of the existing literature on the commercially or specially prepared vaccines discloses a complete non-uniformity in the opinions on the irritating action of the different vaccines even though of the same origin. At one time, strong local or general reaction is especially emphasized; at another time, the complete non-irritability of the whooping cough vaccine is stressed. The reason for these contradictions is apparently that completely uncontrolled poisonous and non-poisonous stocks have been employed whose quantitative participation in the obtained vaccine at any given time determines, accidentally so to speak, the more or less developed irritating action of the vaccines.

With the aid of the present invention, a reliable process is provided of producing vaccines from uniformly poisonous stocks after uniformly artificial removal of poison, and to provide such vaccine when desired with the required degree of toxicity at any time by making suitable combinations of poison-free bacteria and bacteria-free toxin solutions. The proportion of toxic free component will be that necessary to produce the best immunizing action in each case, such action being determined in known manner by the clinical efficiency in prophylactic and therapeutic use. In this way, each of the two partial antigens can be brought into action in suitable amounts and the optimum immunity condition can be provided for the macroorganism, that is, the human being.

We claim:

1. The method of preparing a whooping cough vaccine which comprises subjecting a mixture of stocks of the bacillus Bordet-Gengou, each having constant cultural properties after long cultivation, to the action of a physiologic salt solution, alternately freezing and thawing the bacterial suspension until the remains of the bacteria appear as an amorphous mass under the microscope, then separating the insoluble matter from the toxin solution and utilizing the insoluble matter for making up the vaccine.

2. In a method of preparing polyvalent vaccines from whooping cough bacilli, the step which comprises extracting with water the toxin from different bacterial stocks of the bacillus Bordet-Gengou which originated in epidemics occurring at different times and whose cultural properties and toxin formation remain constant even upon long and continuous cultivation upon artificial culture media, and then working up the toxin-free residues of said cultures together into vaccines.

3. A non-toxic whooping cough vaccine of a high concentration of bacteria and high polyvalency, comprising a separated non-toxic component of a mixture of numerous bacterial stocks of the bacillus Bordet-Gengou which originated in epidemics occurring at different times and whose cultural properties and toxin formation remain constant even upon long and continuous cultivation upon artificial culture media.

4. The method of producing highly polyvalent whooping cough vaccines, which comprises cultivating on artificial culture media a number of different bacterial stocks of the bacillus Bordet-Gengou derived from different whooping cough epidemics occurring at different times, the cultural properties and toxin formation of said stocks remaining constant even on long continuous cultivation on artificial culture media, separating the bacterial cultures from the culture media, eliminating the toxic components from said bacterial cultures, and working up the toxin-free portions of said culture together into vaccines.

5. The method according to claim 4, wherein the removal of the toxic components includes the step of disintegrating the bodies of the bacteria to such an extent that the residue remaining of the bacteria appears under the microscope as an amorphous mass.

6. The method according to claim 4, including the step of repeatedly freezing and thawing out the cultures of bacteria to disintegrate the bodies of the bacteria to such an extent that the residue remaining of the bacteria appears under the microscope as an amorphous mass.

7. The method according to claim 4, wherein a portion of the toxic component is added to the non-poisonous antigen in proportions most suitable for immunization.

8. A polyvalent whooping cough vaccine comprising the non-toxic residue remaining after extracting with water of different bacterial stocks of the bacillus Bordet-Gengou originating in epidemics occurring at different times and having cultural properties and toxin formation which remain constant even upon long and continuous cultivation upon artificial cultural media.

9. A whooping cough vaccine comprising a mixture of the isolated toxic and non-toxic components of a number of different bacterial stocks of the bacillus Bordet-Gengou originating in whooping cough epidemics occurring at different times, said mixture being in proportions most suitable for immunization and differing from the composition of the bacilli themselves, the bacterial stocks having substantially constant cultural and toxin formation properties even on long continuous cultivation on artificial culture media.

10. A whooping cough vaccine comprising the isolated non-toxic, amorphous mass composed of the burst bodies of bacterial cultures of stocks of the bacillus Bordet-Gengou in physiological salt solution, said stocks originating in different epidemics and having substantially constant cultural and toxin formation properties even on long continuous cultivation on artificial culture media.

11. A polyvalent whooping cough vaccine comprising Bordet-Gengou bacilli which have been rendered non-toxic by heating, said bacilli being composed of stocks collected from numerous whooping cough epidemics occurring at different times, the cultural and toxin-formation properties of said stocks having been found to remain constant even on long cultivation on artificial culture media.

12. A whooping cough vaccine containing the toxin-free disrupted bodies of bacteria derived from numerous stocks of the bacillus Bordet-Gengou originating in different whooping cough epidemics cultivated to substantially constant cultural characteristics, the toxin formation of such stocks being substantially constant even on long continuous cultivation on artificial culture media, said vaccine containing at the most only a part of the toxic component of the bacteria.

13. The method of producing highly polyvalent whooping cough vaccines, which comprises cultivating on artificial culture media a number of different bacterial stocks of the bacillus Bordet-Gengou derived from different whooping cough epidemics occurring at different times, the cultural properties and toxin formation of said stocks remaining constant even on long continuous cultivation on artificial culture media, and destroying the toxic component of the bacteria by heating.

HANS LANGER.
ERICH PUTTER.